US012179754B2

(12) United States Patent
Okura et al.

(10) Patent No.: US 12,179,754 B2
(45) Date of Patent: Dec. 31, 2024

(54) VEHICLE CONTROL DEVICE, VEHICLE CONTROL SYSTEM, VEHICLE CONTROL METHOD, AND COMPUTER-READABLE STORAGE MEDIUM

(71) Applicant: Mitsubishi Electric Corporation, Tokyo (JP)

(72) Inventors: Yuichi Okura, Tokyo (JP); Yuko Omagari, Tokyo (JP); Tomoki Uno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 414 days.

(21) Appl. No.: 17/681,000

(22) Filed: Feb. 25, 2022

(65) Prior Publication Data

US 2023/0126923 A1    Apr. 27, 2023

(30) Foreign Application Priority Data

Oct. 27, 2021    (JP) .................................. 2021-175141

(51) Int. Cl.
*B60W 30/16*    (2020.01)
*B60W 10/18*    (2012.01)
(Continued)

(52) U.S. Cl.
CPC ........ *B60W 30/0956* (2013.01); *B60W 10/18* (2013.01); *B60W 30/143* (2013.01);
(Continued)

(58) Field of Classification Search
CPC ............ B60W 30/0956; B60W 10/18; B60W 30/143; B60W 30/16; B60W 40/04;
(Continued)

(56) References Cited

U.S. PATENT DOCUMENTS

2006/0095193 A1    5/2006    Nishira et al.
2014/0188360 A1*   7/2014    Lee ........................ G08G 1/167
                                                  701/70
(Continued)

FOREIGN PATENT DOCUMENTS

DE    102014212704 A1 *   1/2016    ............ B60W 10/04
DE    102015200215 A1 *   7/2016    .......... B60W 30/143
(Continued)

OTHER PUBLICATIONS

Mukthar et al., Vehicle Detection Techniques for Collision Avoidance Systems: A Review, Oct. 2015, IEEE, pp. 1-21 (Year: 2015).*
(Continued)

*Primary Examiner* — Justin S Lee
(74) *Attorney, Agent, or Firm* — Sughrue Mion, PLLC; Richard C. Turner

(57) ABSTRACT

A vehicle control device includes: a surrounding vehicle lane determination unit; a surrounding vehicle behavior prediction unit for predicting whether or not the surrounding vehicle will cut in at a time point after a present; a preceding vehicle determination unit; a target acceleration calculation unit; and a drive force calculation unit for calculating a drive force of the own vehicle. The preceding vehicle determination unit includes: a preceding vehicle candidate selection unit for selecting, as a preceding vehicle candidate, the surrounding vehicle traveling in front on an own vehicle traveling lane and the surrounding vehicle predicted to cut in to the own vehicle traveling lane; a collision risk determination unit for determining a collision risk of each surrounding vehicle selected as the preceding vehicle candidate; and a preceding vehicle selecting unit for selecting, as the preceding vehicle, the surrounding vehicle of which the collision risk is greatest.

16 Claims, 10 Drawing Sheets

(51) Int. Cl.
   *B60W 30/095*   (2012.01)
   *B60W 30/14*    (2006.01)
   *B60W 40/04*    (2006.01)
   *B60W 50/00*    (2006.01)

(52) U.S. Cl.
   CPC ............ *B60W 30/16* (2013.01); *B60W 40/04* (2013.01); *B60W 50/0097* (2013.01); *B60W 2554/4045* (2020.02); *B60W 2554/4046* (2020.02); *B60W 2554/80* (2020.02)

(58) Field of Classification Search
   CPC ......... B60W 50/0097; B60W 2554/80; B60W 2554/4045; B60W 2554/4046
   See application file for complete search history.

(56) References Cited

U.S. PATENT DOCUMENTS

| | | | | |
|---|---|---|---|---|
| 2015/0232095 | A1* | 8/2015 | Sato | B60L 15/2009 |
| | | | | 701/22 |
| 2016/0347181 | A1* | 12/2016 | Yamakado | B60T 7/22 |
| 2017/0154225 | A1* | 6/2017 | Stein | G08G 1/167 |
| 2018/0182245 | A1* | 6/2018 | Takabayashi | G08G 1/167 |
| 2018/0198955 | A1* | 7/2018 | Watanabe | G09G 3/001 |
| 2018/0251129 | A1* | 9/2018 | Ji | B60W 30/18163 |
| 2019/0106101 | A1* | 4/2019 | Takaki | B60T 8/172 |
| 2019/0391582 | A1* | 12/2019 | Jung | B60Q 1/525 |
| 2020/0039510 | A1 | 2/2020 | Kume | |
| 2020/0348671 | A1* | 11/2020 | Stein | G05D 1/0251 |
| 2021/0094577 | A1* | 4/2021 | Shalev-Shwartz | B60W 30/181 |
| 2021/0110484 | A1* | 4/2021 | Shalev-Shwartz | G05D 1/0088 |
| 2022/0041162 | A1* | 2/2022 | Arita | B60W 30/162 |
| 2022/0203984 | A1* | 6/2022 | Vijaya Kumar | B60W 30/162 |
| 2022/0319327 | A1* | 10/2022 | Nakamura | G08G 1/166 |
| 2023/0015357 | A1* | 1/2023 | Kim | G06V 10/751 |
| 2023/0102844 | A1* | 3/2023 | Kim | B60W 50/0097 |
| | | | | 701/26 |

FOREIGN PATENT DOCUMENTS

| | | |
|---|---|---|
| JP | 2006-123795 A | 5/2006 |
| JP | 2017-154614 A | 9/2017 |
| JP | 2018-185673 A | 11/2018 |
| JP | 2020-199787 A | 12/2020 |

OTHER PUBLICATIONS

Office Action dated Sep. 6, 2022 issued by the Japanese Patent Office in Japanese Application No. 2021-175141.

* cited by examiner

VEHICLE CONTROL DEVICE, VEHICLE CONTROL SYSTEM, VEHICLE CONTROL METHOD, AND COMPUTER-READABLE STORAGE MEDIUM

BACKGROUND OF THE INVENTION

1. Field of the Invention

The present disclosure relates to a vehicle control device, a vehicle control system, a vehicle control method, and a computer-readable storage medium.

2. Description of the Background Art

As technology for performing autonomous driving of a vehicle, various types of technologies for avoiding collision by predicting a behavior of a surrounding vehicle at a time point after the present have been proposed. For example, disclosed is a vehicle control technology in which movement of a surrounding vehicle in a direction perpendicular to a traveling direction of the own vehicle is predicted and a surrounding vehicle having a possibility of cutting in to the front of the own vehicle is taken as a candidate for a preceding vehicle to be followed by the own vehicle (see, for example, Patent Document 1).

Patent Document 1: Japanese Laid-Open Patent Publication No. 2006-123795

However, in the conventional vehicle control technology, if there are a plurality of vehicles as candidates for the preceding vehicle, the preceding vehicle cannot be appropriately selected and thus the own vehicle might come close to a surrounding vehicle other than the preceding vehicle. Further, in the conventional vehicle control technology, if a surrounding vehicle is selected as the preceding vehicle after having come close to the own vehicle, the own vehicle needs to greatly decelerate to keep the vehicle-to-vehicle distance to the preceding vehicle, thus causing a problem of impairing comfort for the occupant.

SUMMARY OF THE INVENTION

The present disclosure has been made to solve the above problem, and an object of the present disclosure is to provide a vehicle control device that, when it is predicted that a surrounding vehicle will cut in to the front on the own vehicle traveling lane, selects an appropriate vehicle as a preceding vehicle from a plurality of surrounding vehicles and controls acceleration and deceleration, thereby achieving improvement in comfort for the occupant.

A vehicle control device according to the present disclosure includes: a surrounding vehicle lane determination unit for determining a lane to which a surrounding vehicle present around an own vehicle belongs; a surrounding vehicle behavior prediction unit for predicting whether or not, at a time point after a present, the surrounding vehicle will cut in to an own vehicle traveling lane on which the own vehicle is traveling; a preceding vehicle determination unit for determining, among the surrounding vehicles, a preceding vehicle to be followed by the own vehicle; a target acceleration calculation unit for calculating a target acceleration for keeping a vehicle-to-vehicle distance to the preceding vehicle determined by the preceding vehicle determination unit; and a drive force calculation unit for calculating a drive force of the own vehicle on the basis of the target acceleration calculated by the target acceleration calculation unit. The preceding vehicle determination unit includes: a preceding vehicle candidate selection unit for selecting, as a preceding vehicle candidate, the surrounding vehicle traveling in front on the own vehicle traveling lane and the surrounding vehicle predicted to cut in to the own vehicle traveling lane by the surrounding vehicle behavior prediction unit; a collision risk determination unit for determining a collision risk of each surrounding vehicle selected as the preceding vehicle candidate by the preceding vehicle candidate selection unit; and a preceding vehicle selecting unit for selecting, as the preceding vehicle, the surrounding vehicle of which the collision risk determined by the collision risk determination unit is greatest.

In the vehicle control device according to the present disclosure, the preceding vehicle determination unit includes: the preceding vehicle candidate selection unit for selecting, as a preceding vehicle candidate, the surrounding vehicle traveling in front on the own vehicle traveling lane and the surrounding vehicle predicted to cut in to the own vehicle traveling lane by the surrounding vehicle behavior prediction unit; the collision risk determination unit for determining a collision risk of each surrounding vehicle selected as the preceding vehicle candidate by the preceding vehicle candidate selection unit; and the preceding vehicle selecting unit for selecting, as the preceding vehicle, the surrounding vehicle of which the collision risk determined by the collision risk determination unit is greatest. Thus, comfort for the occupant can be improved.

DETAILED DESCRIPTION OF THE PREFERRED

Embodiments of the Invention

Figure 1:
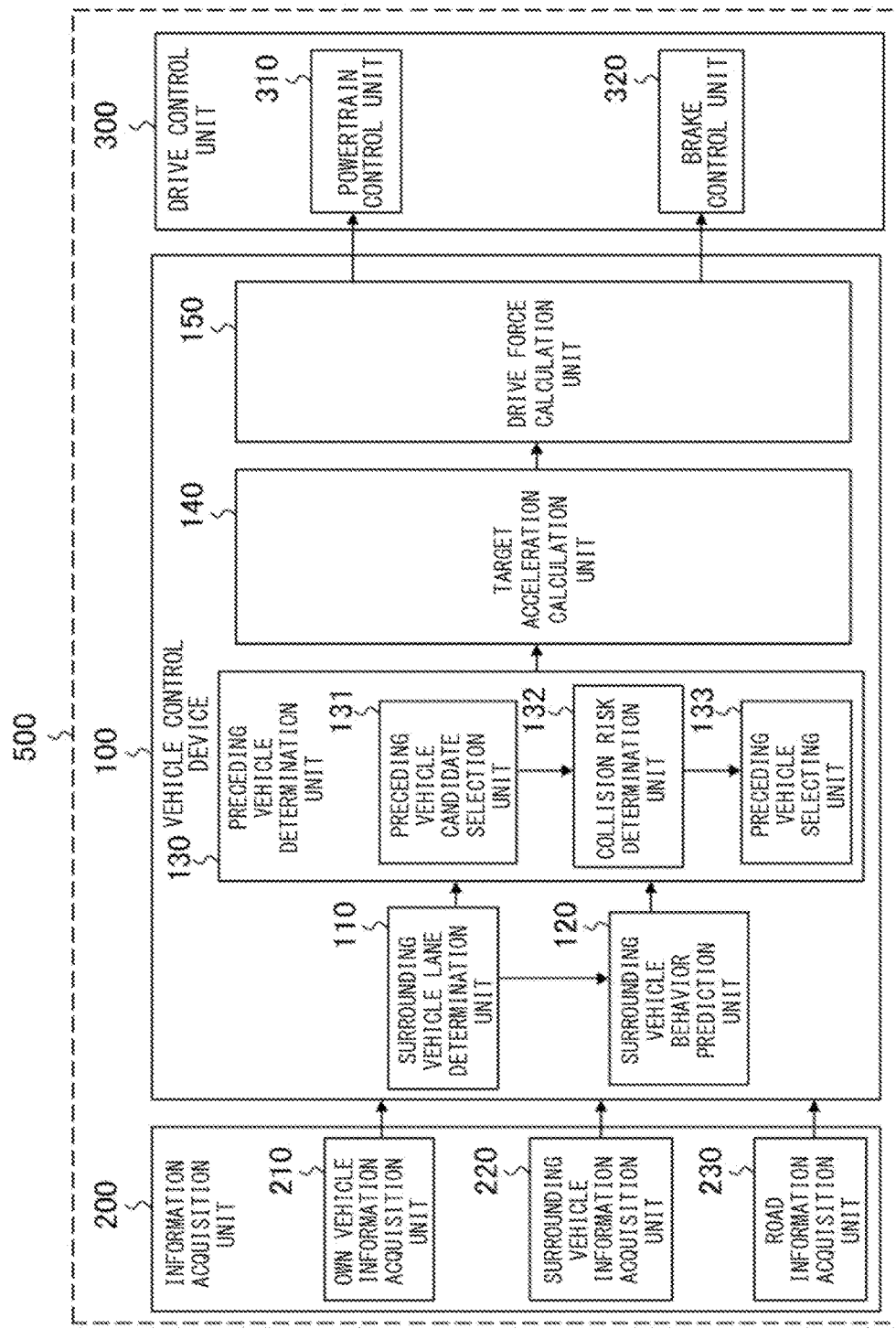
FIG. 1 is a function block diagram showing the configuration of a vehicle control system according to the first embodiment of the present disclosure.

Hereinafter, a vehicle control device and a vehicle control system according to embodiments of the present disclosure will be described in detail, with reference to the drawings. In the drawings, the same reference characters denote the same or corresponding parts.

First Embodiment

FIG. 1 is a function block diagram showing the configurations of a vehicle control device and a vehicle control system according to the first embodiment. A vehicle control system 500 of the present embodiment includes a vehicle control device 100, an information acquisition unit 200, and a drive control unit 300.

The vehicle control device 100 includes a surrounding vehicle lane determination unit 110, a surrounding vehicle behavior prediction unit 120, a preceding vehicle determination unit 130, a target acceleration calculation unit 140, and a drive force calculation unit 150.

The information acquisition unit 200 includes an own vehicle information acquisition unit 210, a surrounding vehicle information acquisition unit 220, and a road information acquisition unit 230.

The drive control unit 300 includes a powertrain control unit 310 and a brake control unit 320 for performing drive control of the own vehicle.

The surrounding vehicle lane determination unit 110 determines, for each surrounding vehicle, a lane to which the surrounding vehicle belongs, using surrounding vehicle information acquired by the surrounding vehicle information acquisition unit 220 and road information acquired by the road information acquisition unit 230, and outputs the determined lane. Here, the surrounding vehicle refers to another vehicle present around a vehicle (hereinafter, referred to as an own vehicle) provided with the vehicle control system 500. In the following description, it is assumed that surrounding vehicles are automobiles. However, besides automobiles, two-wheel vehicles, pedestrians, and the like may be included. In this case, a term "surrounding object" may be used instead of the term "surrounding vehicle".

The surrounding vehicle behavior prediction unit 120 predicts whether or not a surrounding vehicle will cut in from the adjacent lane to a traveling lane of the own vehicle (hereinafter, referred to as own vehicle traveling lane) at a time point after the present, using the surrounding vehicle information acquired by the surrounding vehicle information acquisition unit 220 and the information of the lane to which the surrounding vehicle belongs, determined by the surrounding vehicle lane determination unit 110. In the present embodiment, the time point after the present is a time point at approximately 0.1 second to 60 seconds after the present, and this period is a period required for avoiding collision between vehicles. The time point after the present may be, in other words, a time point in the near future.

The preceding vehicle determination unit 130 includes a preceding vehicle candidate selection unit 131, a collision risk determination unit 132, and a preceding vehicle selecting unit 133.

The preceding vehicle candidate selection unit 131 selects a surrounding vehicle as a candidate for a preceding vehicle to be followed by the own vehicle (hereinafter, referred to as a preceding vehicle candidate), on the basis of the calculation results of the surrounding vehicle lane determination unit 110 and the surrounding vehicle behavior prediction unit 120. The details of this processing will be described later.

The collision risk determination unit 132 calculates a collision risk which is an index of a possibility of colliding with the own vehicle, for each of the surrounding vehicles selected as preceding vehicle candidates by the preceding vehicle candidate selection unit 131. The details of this processing will be described later.

The preceding vehicle selecting unit 133 selects, as the preceding vehicle to be followed by the own vehicle, the surrounding vehicle having the greatest collision risk among the collision risks calculated by the collision risk determination unit 132, from the preceding vehicle candidates. The preceding vehicle selecting unit 133 may determine that there is no preceding vehicle to be followed by the own vehicle. The details of this processing will be described later.

If the preceding vehicle determination unit 130 determines that there is no preceding vehicle, the target acceleration calculation unit 140 calculates a target acceleration for causing the speed of the own vehicle to reach a predetermined target speed. If the preceding vehicle determination unit 130 determines that there is a preceding vehicle, the target acceleration calculation unit 140 calculates a target acceleration for the own vehicle to keep its vehicle-to-vehicle distance without colliding with the preceding vehicle. As used herein, the target acceleration includes an acceleration and a deceleration.

As the calculation method of the target acceleration calculation unit 140, a method conventionally proposed for adaptive cruise control (ACC) may be used. In ACC, first, using the position and the speed of the preceding vehicle, a relative distance and a relative velocity between the own vehicle and the preceding vehicle at a time point after the present are calculated. Then, using the relative distance and the relative velocity between the own vehicle and the preceding vehicle at the time point after the present, closeness between the own vehicle and the preceding vehicle is assessed.

Assessment for closeness between the own vehicle and the preceding vehicle is an index for assessing a condition that, at a time point after the present, the relative distance between the own vehicle and the preceding vehicle is kept so as not to be shorter than a certain distance and the relative velocity is reduced in such a range that the speed of the own vehicle does not exceed an upper limit speed. The target acceleration calculation unit 140 calculates the target acceleration for the own vehicle so as to enhance the assessment of closeness, and outputs the target acceleration.

The drive force calculation unit 150 calculates a target drive force for controlling the powertrain control unit 310 of the drive control unit 300 and a target brake force for controlling the brake control unit 320, using the target acceleration calculated by the target acceleration calculation unit 140 and vehicle information of the own vehicle obtained from the own vehicle information acquisition unit 210 of the information acquisition unit 200, and outputs the calculated target drive force and target brake force.

Figure 2:
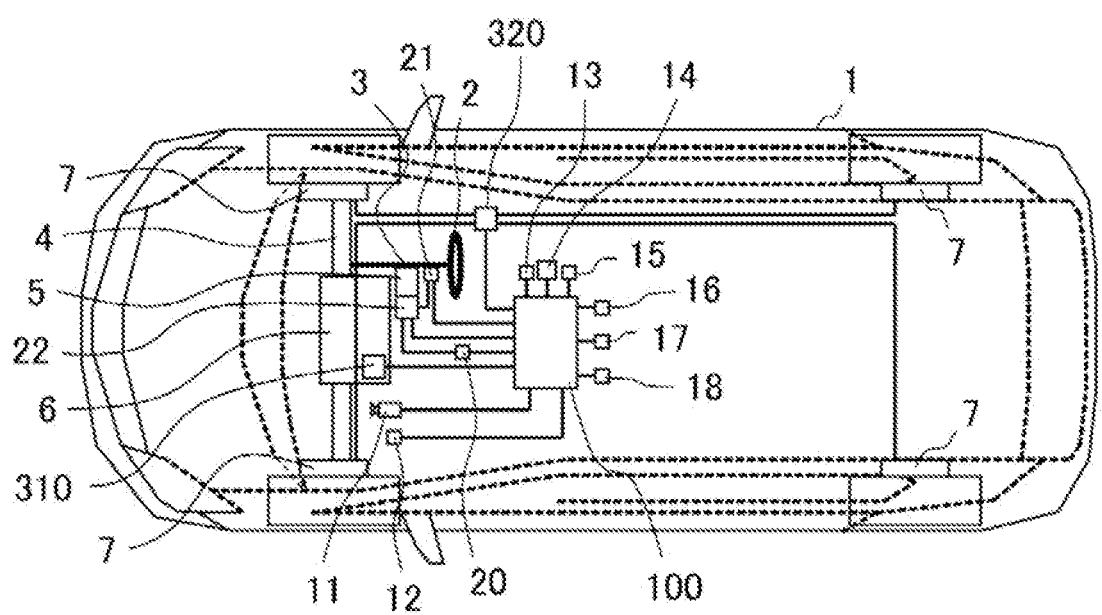
FIG. 2 is a schematic diagram showing an example of a hardware configuration of a vehicle provided with the vehicle control system according to the first embodiment.

FIG. 2 shows an example of a hardware configuration of the own vehicle provided with the vehicle control system 500 including the vehicle control device 100 of the present embodiment. As shown in FIG. 2, the own vehicle 1 includes, as a drive system, a steering wheel 2, a steering shaft 3, a steering unit 4, an electric power steering (EPS) motor 5, a powertrain unit 6, and a brake unit 7. The powertrain unit 6 is an engine using gasoline as fuel, for example.

In addition, the own vehicle 1 includes, as a sensor system, a front camera 11, a radar sensor 12, a global navigation satellite system (GNSS) sensor 13, a yaw rate sensor 16, a velocity sensor 17, an acceleration sensor 18, a steering angle sensor 20, and a steering torque sensor 21.

Further, the own vehicle 1 includes a navigation device 14, a vehicle-to-everything (V2X) receiver 15, the vehicle control device 100, an EPS controller 22, the powertrain control unit 310, and the brake control unit 320.

The steering wheel 2 provided for a driver to drive the own vehicle is connected to the steering shaft 3. The steering unit 4 is connected to the steering shaft 3. The steering unit 4 rotatably supports two tires of the front wheels which are wheels to be steered, and is turnably supported by a vehicle body frame. Thus, torque generated through operation of the steering wheel 2 by the driver causes the steering shaft 3 to rotate, thus turning the front wheels in the left-right direction by the steering unit 4. By the driver operating the steering wheel 2, it is possible to operate lateral movement of the own vehicle when moving forward/backward.

It is noted that the steering shaft 3 can also be rotated by an EPS motor 5. The EPS controller 22 controls current flowing through the EPS motor 5 and thereby can turn the front wheels independently of operation of the steering wheel 2 by the driver.

The vehicle control device 100 is, as an example, an integrated circuit such as a microprocessor that is also called an advanced driving assistance systems-electronic control unit (ADAS-ECU), and includes an analog/digital (A/D) conversion circuit, a digital/analog (D/A) conversion circuit, a central processing unit (CPU), a read only memory (ROM), a random access memory (RAM), and the like.

To the vehicle control device 100, the following components are connected: the front camera 11, the radar sensor 12, the GNSS sensor 13, the navigation device 14, the V2X receiver 15, the yaw rate sensor 16 for detecting the yaw rate, the velocity sensor 17 for detecting the velocity of the own vehicle, the acceleration sensor 18 for detecting the acceleration of the own vehicle, the steering angle sensor 20 for detecting the steering angle, the steering torque sensor 21 for detecting the steering torque, the EPS controller 22, the powertrain control unit 310, and the brake control unit 320.

The vehicle control device 100 processes information inputted from various sensors connected thereto, in accordance with a program stored in the ROM, and transmits the target drive force to the powertrain control unit 310 and the target brake force to the brake control unit 320.

The front camera 11 is provided at such a position that a front contour line of the vehicle can be detected as an image, and detects an environment frontward of the own vehicle, such as lane information and obstacle positions on the basis of image information. In the vehicle control system 500 according to the present embodiment, only the camera for detecting the environment frontward of the own vehicle is used as an example. However, other cameras for detecting a rearward environment and a lateral environment around the own vehicle may be provided. In addition, the front camera 11 can also be used for estimating the state of a road surface on which the own vehicle travels.

The radar sensor 12 radiates radio waves to a target object, detects a reflected wave based on the radiated radio waves, and thereby outputs the relative distance and the relative velocity between the own vehicle and the surrounding vehicle. The radar sensor 12 may be a well-known ranging sensor such as a millimeter-wave radar, a light detection and ranging (LiDAR) sensor, a laser rangefinder, or an ultrasonic radar.

The GNSS sensor 13 receives radio waves from a positioning satellite by an antenna (not shown) provided to the own vehicle, performs positioning calculation, and thereby outputs the absolute position and the absolute orientation of the own vehicle.

The navigation device 14 has a function of calculating an optimum traveling route for a destination set by the driver, and stores road information on the traveling route. The road information is map node data representing road line shapes. Each map node data includes information such as a latitude, a longitude, an altitude, a lane width, a cant angle, and a slope angle representing the absolute position at the node.

The V2X receiver 15 has a function of acquiring information via wireless communication between the own vehicle and each of roadside devices and other vehicles including surrounding vehicles, and outputting the information. The acquired information includes surrounding vehicle information such as the position and the velocity of a surrounding vehicle relative to the own vehicle, and road information such as a friction coefficient of a road.

The EPS controller 22 controls the EPS motor 5 so as to achieve a target steering angle transmitted from the vehicle control device 100, thereby controlling the traveling direction of the own vehicle.

The powertrain control unit 310 controls the powertrain unit 6 so as to achieve a target acceleration transmitted from the vehicle control device 100, thereby controlling acceleration of the own vehicle.

The brake control unit 320 controls the brake unit 7 so as to achieve a target brake force transmitted from the vehicle control device 100, thereby controlling deceleration of the own vehicle.

The own vehicle information acquisition unit 210 acquires vehicle information which is information of the own vehicle. The vehicle information includes a state quantity of the own vehicle representing the state of the own vehicle. The own vehicle information acquisition unit 210 is, for example, the GNSS sensor 13, the yaw rate sensor 16, the velocity sensor 17, the acceleration sensor 18, the steering angle sensor 20, the steering torque sensor 21, and the like.

The surrounding vehicle information acquisition unit 220 acquires surrounding vehicle information including position information of a surrounding vehicle present around the own vehicle. The surrounding vehicle information acquisition unit 220 is, for example, the front camera 11, the radar sensor 12, the V2X receiver 15, and the like.

The road information acquisition unit 230 acquires road information which is information of a road on which the own vehicle travels. The road information acquisition unit 230 is, for example, the front camera 11, the navigation device 14, the V2X receiver 15, and the like.

In this example, the own vehicle provided with the vehicle control system 500 according to the present embodiment is a vehicle using only an engine as a drive force source. However, a vehicle using only an electric motor as a drive force source, or a vehicle using both of an engine and an electric motor as a drive force source, is also applicable.

Next, operation of the vehicle control device 100 according to the present embodiment will be described.

Figure 3:
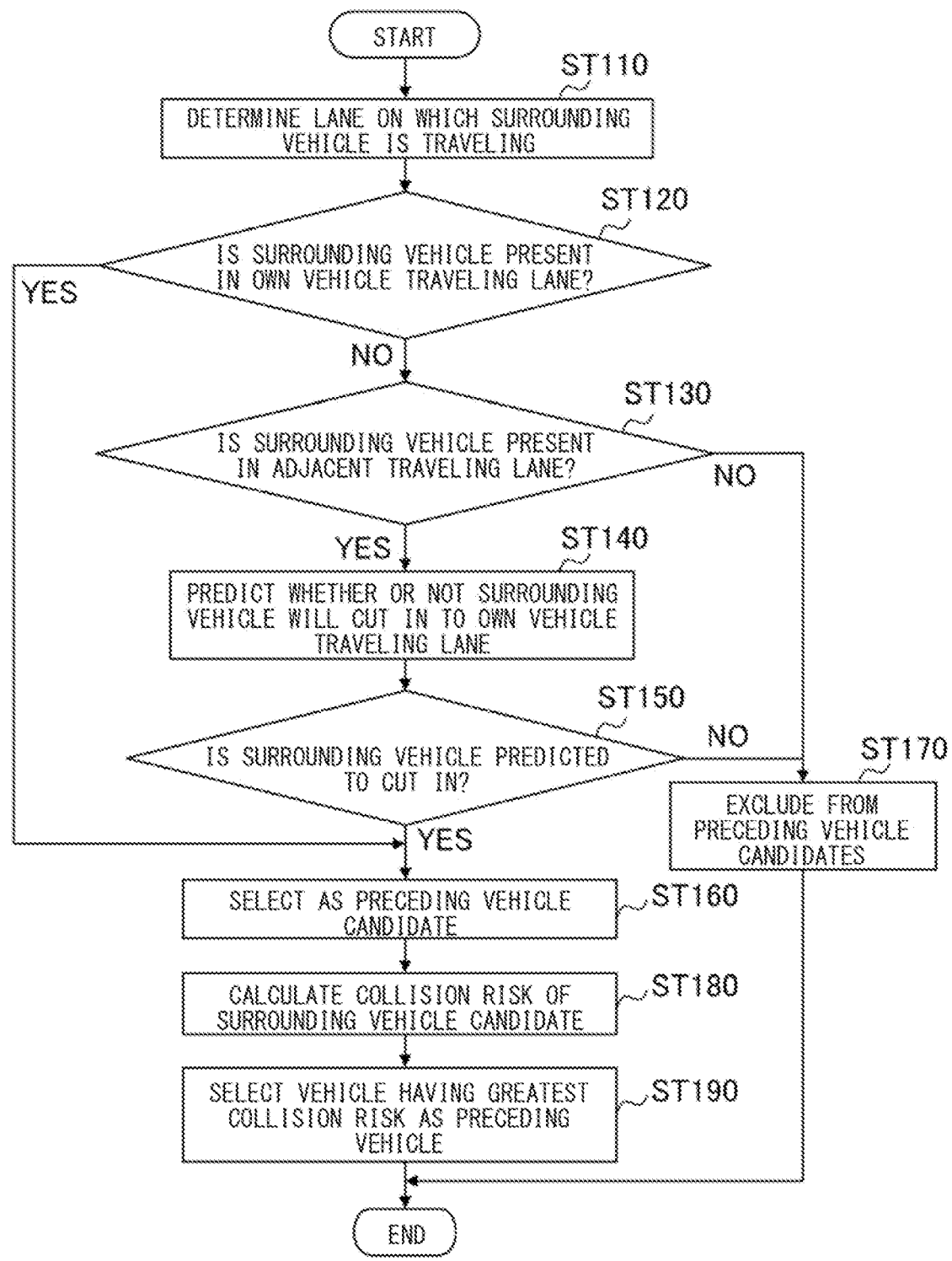
FIG. 3 is a flowchart showing operation of a vehicle control device according to the first embodiment.

FIG. 3 is a flowchart showing a processing flow of the vehicle control device 100 in the present embodiment. Step ST110, step ST120, and step ST130 are performed by the surrounding vehicle lane determination unit 110, step ST140 and step ST150 are performed by the surrounding vehicle behavior prediction unit 120, step ST160 and step ST170 are performed by the preceding vehicle candidate selection unit 131, step ST180 is performed by the collision risk determination unit 132, and step ST190 is performed by the preceding vehicle selecting unit 133.

In step ST110, the surrounding vehicle lane determination unit 110 determines a lane to which a surrounding vehicle belongs, on the basis of position information of the surrounding vehicle acquired by the surrounding vehicle information acquisition unit 220 and position information of traveling lanes acquired by the road information acquisition unit 230.

In step ST120, the surrounding vehicle lane determination unit 110 selects the next step to proceed, on the basis of the lane information of the surrounding vehicle determined in step ST110. If the surrounding vehicle is present in the own vehicle traveling lane (YES), the surrounding vehicle lane determination unit 110 proceeds to step ST160. If the surrounding vehicle is present in a place other than the own vehicle traveling lane (NO), the surrounding vehicle lane determination unit 110 proceeds to step ST130.

In step ST130, the surrounding vehicle lane determination unit 110 selects the next step to proceed, on the basis of the lane information of the surrounding vehicle determined to be present in a place other than the own vehicle traveling lane in step ST120. If the surrounding vehicle is present in an adjacent lane which is a lane adjacent to the own vehicle traveling lane (YES), the surrounding vehicle lane determination unit 110 proceeds to step ST140. Otherwise (NO), the surrounding vehicle lane determination unit 110 proceeds to step ST170.

In step ST140, the surrounding vehicle behavior prediction unit 120 predicts whether or not the surrounding vehicle determined to be present in the adjacent lane in step ST130 will cut in to the front of the own vehicle at a time point after the present. Prediction performed by the surrounding vehicle behavior prediction unit 120 in step ST140 may be performed by the following method, for example.

For the calculation in step ST140, for example, technology disclosed in WO2017/002441 can be applied. On the basis of the relationship of the relative distance and the relative velocity between a target vehicle which is a prediction target for whether or not the vehicle will cut in, and a surrounding vehicle present therearound, the surrounding vehicle behavior prediction unit 120 predicts a behavior of the target vehicle for avoiding collision with the surrounding vehicle. Examples of a behavior for avoiding collision include avoidance behaviors by braking, by leftward steering, and by rightward steering. The surrounding vehicle behavior prediction unit 120 assesses such collision avoidance behaviors, to predict whether or not the target vehicle will cut in to the own vehicle traveling lane. For example, it is assumed that the surrounding vehicle is traveling on the adjacent lane at the left of the own vehicle traveling lane. If it is predicted that the surrounding vehicle will perform an avoidance behavior by braking or leftward steering as a collision avoidance behavior, it is predicted that the surrounding vehicle will not cut in to the own vehicle traveling lane. If it is predicted that the surrounding vehicle will perform an avoidance behavior by rightward steering as a collision avoidance behavior, it is predicted that the surrounding vehicle will cut in to the own vehicle traveling lane. Prediction for cut-in in step ST140 may be performed by another method such as a method of predicting cut-in by detecting operation of a direction indicator of the surrounding vehicle.

In step ST150, the surrounding vehicle behavior prediction unit 120 selects the next step to proceed, on the basis of the prediction result in step ST140. If it is predicted that the surrounding vehicle will cut in from the adjacent lane to the own vehicle traveling lane in step ST140 (YES), the surrounding vehicle behavior prediction unit 120 proceeds to step ST160. Otherwise (NO), the surrounding vehicle behavior prediction unit 120 proceeds to step ST170.

In step ST160, the preceding vehicle candidate selection unit 131 selects, as preceding vehicle candidates, the surrounding vehicle determined to be present on the own vehicle traveling lane in step ST120 and the surrounding vehicle predicted to cut in from the adjacent lane to the own vehicle traveling lane in step ST150. On the other hand, in step ST170, the preceding vehicle candidate selection unit 131 excludes, from preceding vehicle candidates, the surrounding vehicle determined not to be present on the adjacent lane in step ST130 and the surrounding vehicle not predicted to cut in from the adjacent lane to the own vehicle traveling lane in step ST150.

In step ST180, the collision risk determination unit 132 calculates a collision risk between the own vehicle and each surrounding vehicle selected as the preceding vehicle candidate in step ST160. The collision risk can be calculated using a time to collision (TTC), for example. The calculation method for the collision risk performed by the collision risk determination unit 132 in step ST180 will be described later.

In step ST190, the preceding vehicle selecting unit 133 selects and outputs, as a preceding vehicle, the preceding vehicle candidate having the greatest collision risk among the collision risks of the preceding vehicle candidates calculated in step ST180. If there is no preceding vehicle candidate, the preceding vehicle selecting unit 133 may determine that there is no preceding vehicle to be followed by the own vehicle. Alternatively, the preceding vehicle selecting unit 133 may set a threshold for the collision risk and may determine that there is no preceding vehicle to be followed by the own vehicle if there is no preceding vehicle candidate having a collision risk greater than the threshold.

Figure 4:
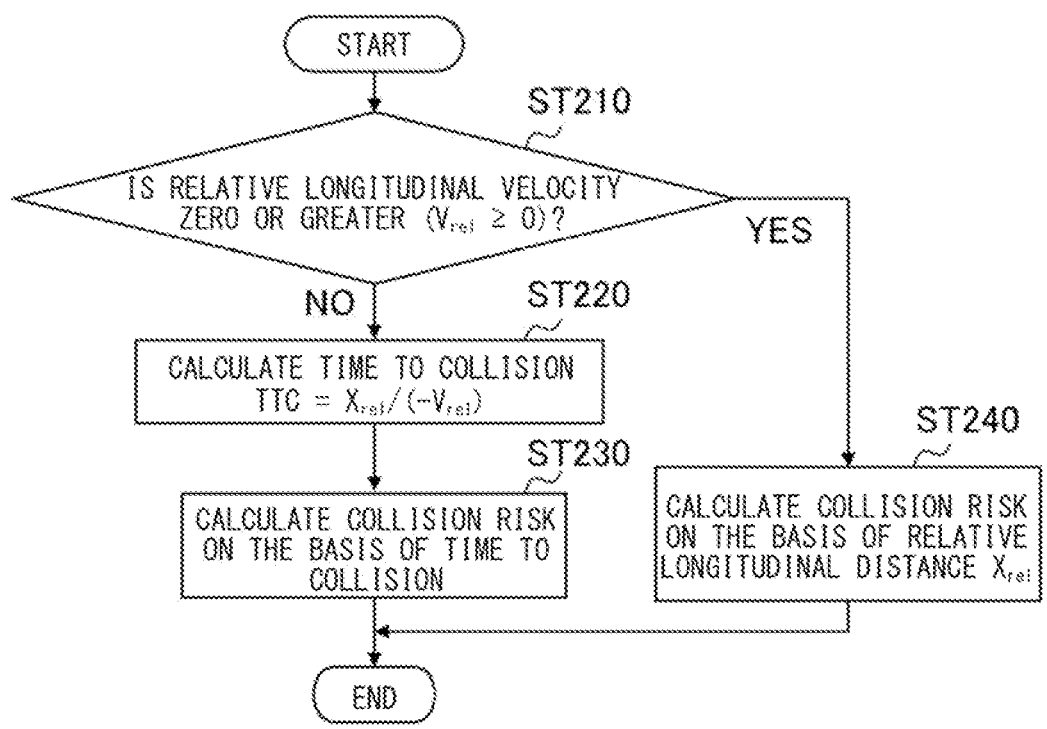
FIG. 4 is a flowchart showing operation of a collision risk determination unit of the vehicle control device according to the first embodiment.

FIG. 4 is a flowchart of a calculation method for the collision risk performed by the collision risk determination unit 132 in step ST180.

In a relative coordinate system with respect to the advancing direction of the own vehicle using the own vehicle position as the origin, a relative longitudinal distance of the surrounding vehicle is denoted by $X_{rel}$ and a relative longitudinal velocity thereof is denoted by $V_{rel}$. The relative longitudinal velocity is represented relative to the velocity of the own vehicle. If the velocity of the target surrounding vehicle is faster than the velocity of the own vehicle, the relative longitudinal velocity is positive, and if the velocity of the target surrounding vehicle is slower than the velocity of the own vehicle, the relative longitudinal velocity is negative.

In step ST210, the collision risk determination unit 132 selects the next step to proceed, on the basis of the relative longitudinal velocity of the preceding vehicle candidate. If the velocity of the preceding vehicle candidate is greater than or equal to the velocity of the own vehicle, i.e., the relative longitudinal velocity is zero or greater (YES), the collision risk determination unit 132 proceeds to step ST240. If the velocity of the preceding vehicle candidate is smaller than the velocity of the own vehicle, i.e., the relative longitudinal velocity is negative (NO), the collision risk determination unit 132 proceeds to step ST220.

In step ST220, the collision risk determination unit 132 calculates a time to collision TTC using the relative longitudinal distance $X_{rel}$ and the relative longitudinal velocity $V_{rel}$ of the preceding vehicle candidate. The time to collision TTC can be calculated by the following expression (1).

$$TTC = X_{rel}/(-V_{rel}) \qquad (1)$$

In step ST230, the collision risk determination unit 132 calculates the collision risk using the time to collision TTC. As the time to collision TTC becomes shorter, a time taken until collision with the preceding vehicle candidate becomes shorter and therefore the collision risk is set to be greater. In this way, the collision risk determination unit 132 determines the collision risk to be greater for the preceding vehicle candidate for which the time taken until collision is shorter.

In step ST240, the collision risk determination unit 132 calculates the collision risk for the case where the relative longitudinal velocity of the preceding vehicle candidate is zero or greater. In the case where the relative longitudinal velocity is zero or greater, the velocity of the own vehicle is the same as the velocity of the preceding vehicle candidate, or the velocity of the own vehicle is slower than the velocity of the preceding vehicle candidate. At this time, the own vehicle never collides with the preceding vehicle candidate, and therefore the time to collision cannot be defined. Accordingly, the collision risk determination unit 132 calculates the collision risk on the basis of the relative longitudinal distance $X_{rel}$, without using the time to collision. The collision risk determination unit 132 performs setting such that the collision risk becomes greater for the preceding vehicle candidate having a smaller relative longitudinal distance $X_{rel}$, i.e., present at a position closer to the own vehicle. It is noted that the collision risk set in step ST240 is smaller than the collision risk set in step ST230.

In the vehicle control device configured as described above, a preceding vehicle candidate is selected on the basis of prediction for cut-in from the adjacent lane to the own vehicle traveling lane, the collision risk is calculated for the preceding vehicle candidate, and the surrounding vehicle having the greatest collision risk is selected as the preceding vehicle. Thus, the surrounding vehicle predicted to cut in from the adjacent lane to the front on the own vehicle traveling lane is added to preceding vehicle candidates in advance, and from the preceding vehicle candidates, an appropriate vehicle can be selected as a preceding vehicle, to perform control for following the preceding vehicle. As a result, acceleration and deceleration can be smoothly performed, thereby providing an effect of improving comfort for the occupant.

In the vehicle control device of the present embodiment, information based on the surrounding vehicle position may be added for selecting the preceding vehicle candidate.

Figure 5:
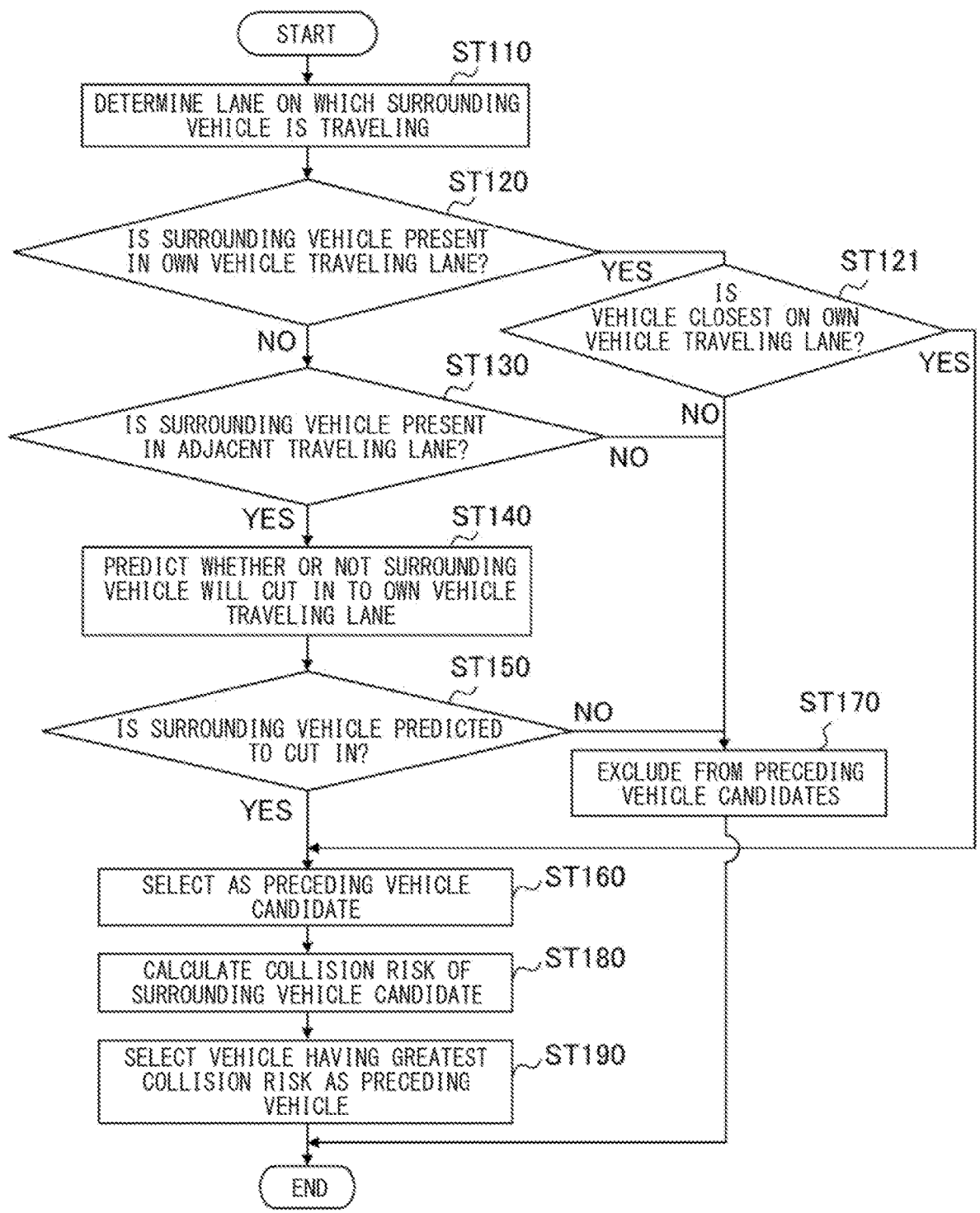
FIG. 5 is a flowchart showing operation of the vehicle control device according to the first embodiment.

FIG. 5 is a flowchart showing another processing flow of the vehicle control device 100 in the present embodiment. This flowchart shows a process in a case of excluding, from the preceding vehicle candidates, the surrounding vehicle present at a far position in the own vehicle traveling lane, in a selection condition for the preceding vehicle candidates.

In FIG. 5, operation of the surrounding vehicle lane determination unit 110 in step ST110 is the same as operation of the surrounding vehicle lane determination unit 110 described in FIG. 3. In step ST120, if the surrounding vehicle is present in the own vehicle traveling lane (YES), the surrounding vehicle lane determination unit 110 proceeds to step ST121. If the surrounding vehicle is present in a place other than the own vehicle traveling lane (NO), the surrounding vehicle lane determination unit 110 proceeds to step ST130.

In step ST121, the surrounding vehicle lane determination unit 110 selects the next step to proceed, on the basis of the positional relationship of each surrounding vehicle determined to be present in the own vehicle traveling lane. If there are a plurality of vehicles in the own vehicle traveling lane, the surrounding vehicle lane determination unit 110 selects the surrounding vehicle closest to the own vehicle, and proceeds to step ST160. On the other hand, for the vehicles other than the closest vehicle, the surrounding vehicle lane determination unit 110 proceeds to step ST170.

In the vehicle control device configured as described above, the closest surrounding vehicle in the own vehicle traveling lane is selected as the preceding vehicle candidate. Thus, a surrounding vehicle at a far position in the own vehicle traveling lane can be prevented from being erroneously selected as the preceding vehicle candidate. As a result, the vehicle control device can prevent collision with the closest surrounding vehicle in the own vehicle traveling lane.

Second Embodiment

In the vehicle control device according to the first embodiment, the collision risk determination unit calculates the collision risk using the time to collision with the surrounding vehicle. In a vehicle control device according to the second embodiment, the collision risk determination unit corrects the collision risk using a probability that a cut-in predictive vehicle will cut in. The configuration of the vehicle control device in the present embodiment is similar to the configuration of the vehicle control device in the first embodiment. In addition, operation of the vehicle control device in the present embodiment is also similar to the flowchart shown in FIG. 3 of the first embodiment. The operation of the vehicle control device in the present embodiment is different in the calculation method for the collision risk by the collision risk determination unit in step ST180 in FIG. 3.

In the vehicle control device of the present embodiment, in step ST140, the surrounding vehicle behavior prediction unit performs operation of, in addition to assessing a collision avoidance behavior and predicting whether or not a target vehicle will cut in to the own vehicle traveling lane, calculating a probability that the target vehicle will cut in (hereinafter, referred to as a cut-in predictive probability). In addition, a vehicle for which the cut-in predictive probability is greater than a predetermined threshold is referred to as a cut-in predictive vehicle. As a calculation method for the cut-in predictive probability, for example, the cut-in predictive probability may be calculated from a ratio at which the target vehicle selects each of the avoidance behavior by braking, the avoidance behavior by leftward steering, and the avoidance behavior by rightward steering, on the basis of the relationship of the relative distance and the relative velocity between the target vehicle and the surrounding vehicle present therearound. The surrounding vehicle behavior prediction unit sends the cut-in predictive probability and the cut-in predictive vehicle calculated in step ST140, to the collision risk determination unit.

Figure 6:
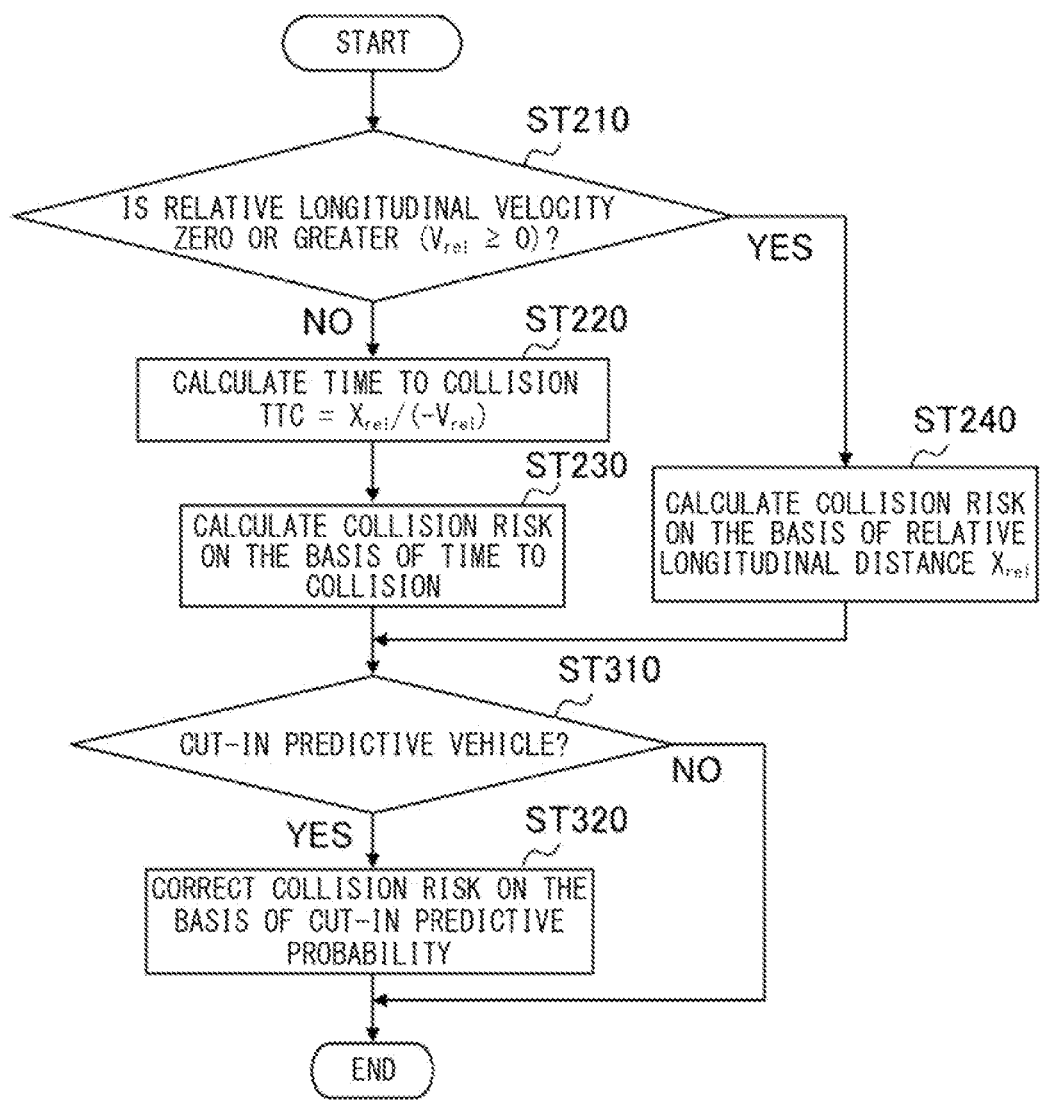
FIG. 6 is a flowchart showing operation of a collision risk determination unit of a vehicle control device according to the second embodiment of the present disclosure.

FIG. 6 is a flowchart showing the calculation method for the collision risk performed by the collision risk determination unit in the vehicle control device of the present embodiment. In the flowchart of the calculation method for the collision risk performed by the collision risk determination unit in the present embodiment, step ST310 and step ST320 are added to the flowchart shown in FIG. 4 of the first embodiment.

In step ST310, the collision risk determination unit selects the next step to proceed, on the basis of whether or not the preceding vehicle candidate is the cut-in predictive vehicle. If the preceding vehicle candidate is not the cut-in predictive vehicle (NO), the collision risk determination unit ends the process without performing correction processing. If the preceding vehicle candidate is the cut-in predictive vehicle (YES), the collision risk determination unit proceeds to step ST320.

In step ST320, the collision risk determination unit corrects the collision risk on the basis of the cut-in predictive probability calculated by the surrounding vehicle behavior prediction unit. The collision risk is corrected to be smaller as the cut-in predictive probability becomes smaller. Alternatively, if the cut-in predictive probability is smaller than a predetermined threshold, the collision risk may be set to 0, and if the cut-in predictive probability is greater than the predetermined threshold, the collision risk may not be corrected.

In the vehicle control device configured as described above, the collision risk for the cut-in predictive vehicle predicted to cut in from the adjacent lane to the own vehicle traveling lane is corrected on the basis of the cut-in predictive probability. Thus, it is possible to prevent such an operation that the cut-in predictive vehicle having a low cut-in possibility is selected as the preceding vehicle and control for following this preceding vehicle is performed. As a result, comfort for the occupant is further improved.

Third Embodiment

In a vehicle control device according to the third embodiment, the collision risk determination unit performs correction processing for the relative longitudinal velocity when calculating the time to collision. The configuration of the vehicle control device in the present embodiment is similar to the configuration of the vehicle control device in the first embodiment. In addition, operation of the vehicle control device in the present embodiment is also similar to the flowchart shown in FIG. 3 of the first embodiment. The operation of the vehicle control device in the present embodiment is different in the calculation method for the collision risk by the collision risk determination unit in step ST180 in FIG. 3.

Figure 7:
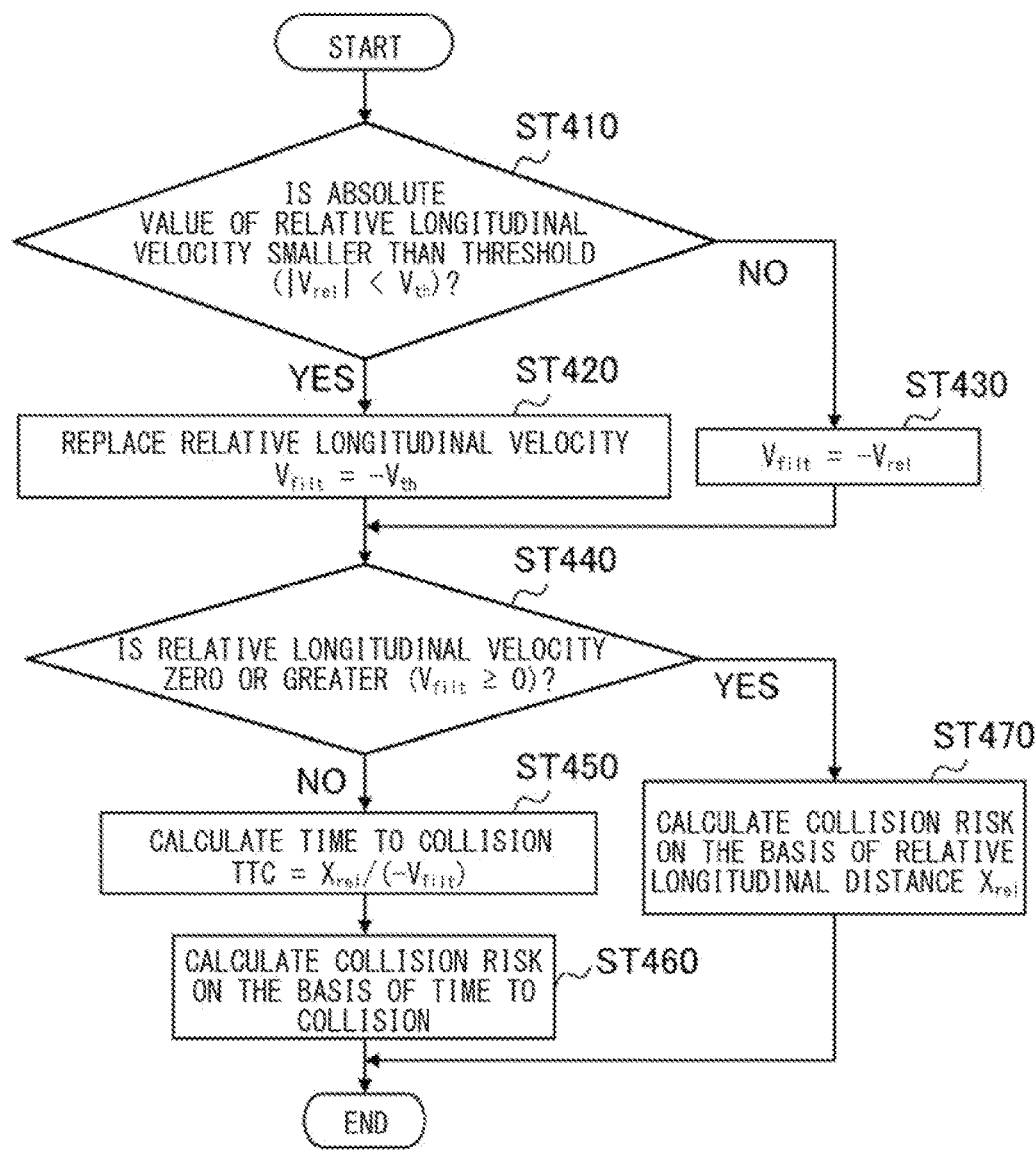
FIG. 7 is a flowchart showing operation of a collision risk determination unit of a vehicle control device according to the third embodiment of the present disclosure.

FIG. 7 is a flowchart showing the calculation method for the collision risk performed by the collision risk determination unit in the vehicle control device of the present embodiment. In step ST410, the collision risk determination unit selects the next step to proceed, on the basis of the relative longitudinal velocity of the preceding vehicle candidate. If the absolute value of the relative longitudinal velocity $V_{rel}$ of the preceding vehicle candidate is smaller than a predetermined threshold $V_{th}$ (YES), the collision risk determination unit proceeds to step ST420. Otherwise (NO), the collision risk determination unit proceeds to step ST430. The threshold $V_{th}$ is a positive value. Hereinafter, the relative longitudinal velocity corrected in step ST420 and step ST430 is denoted by $V_{filt}$.

In a case of proceeding to step ST420, the collision risk determination unit replaces the relative longitudinal velocity $V_{filt}$ of the preceding vehicle candidate with a value obtained by multiplying the threshold $V_{th}$ by −1. In a case of proceeding to step ST430, the collision risk determination unit keeps the relative longitudinal velocity $V_{filt}$ of the preceding vehicle candidate at $V_{rel}$. The corrected relative longitudinal velocity $V_{filt}$ of the preceding vehicle candidate with step ST420 and step ST430 combined can be represented by the following expression (2).

$$V_{filt} = \begin{cases} V_{rel}(|V_{rel}| \geq V_{th}) \\ -V_{th}(|V_{rel}| < V_{th}) \end{cases} \quad (2)$$

In step ST440, the collision risk determination unit selects the next step to proceed, on the basis of the corrected relative longitudinal velocity $V_{filt}$. If the relative longitudinal velocity $V_{filt}$ is zero or greater (YES), the collision risk determination unit proceeds to step ST470. If the relative longitudinal velocity $V_{filt}$ is negative (NO), the collision risk determination unit proceeds to step ST450.

In step ST450, the collision risk determination unit calculates the time to collision TTC using the relative longitudinal distance $X_{rel}$ and the relative longitudinal velocity $V_{filt}$ of the preceding vehicle candidate.

In step ST460, the collision risk determination unit calculates the collision risk using the time to collision TTC. As the time to collision TTC becomes shorter, a time taken until collision with the preceding vehicle candidate becomes shorter and therefore the collision risk is set to be greater. In this way, the collision risk determination unit determines the collision risk to be greater for the preceding vehicle candidate for which the time taken until collision is shorter.

In step ST470, the collision risk determination unit calculates the collision risk for the case where the relative longitudinal velocity $V_{filt}$ is zero or greater. In the case where the relative longitudinal velocity $V_{filt}$ is zero or greater, the velocity of the own vehicle is the same as the velocity of the preceding vehicle candidate, or the velocity of the own vehicle is slower than the velocity of the preceding vehicle candidate. At this time, the own vehicle never collides with the preceding vehicle candidate, and therefore the time to collision cannot be defined. Accordingly, the collision risk determination unit calculates the collision risk on the basis of the relative longitudinal distance $X_{rel}$, without using the time to collision. The collision risk determination unit performs setting such that the collision risk becomes greater for the preceding vehicle candidate having a smaller relative longitudinal distance $X_{rel}$, i.e., present at a position closer to the own vehicle.

In a case where the absolute value of the relative longitudinal velocity of a surrounding vehicle is close to 0, if the time to collision is calculated using this relative longitudinal velocity, the time to collision becomes very long, so that the collision risk becomes very small. In the vehicle control device of the present embodiment, when the absolute value of the relative longitudinal velocity of the surrounding vehicle is close to 0, i.e., the relative longitudinal velocity is smaller than the threshold $V_{th}$, the relative longitudinal velocity is corrected to a negative value of the threshold. Thus, the time to collision calculated in step ST450 is prevented from becoming very long. In addition, when the relative longitudinal velocity of the surrounding vehicle is smaller than the threshold $V_{th}$, since the relative longitudinal velocity thereof is corrected to a negative value of the threshold, the collision risk of this surrounding vehicle is calculated on the basis of the relative longitudinal distance instead of the time to collision. As a result, the vehicle control device of the present embodiment can select an appropriate preceding vehicle, to perform control for following the preceding vehicle, whereby comfort for the occupant is further improved.

Fourth Embodiment

In the vehicle control devices according to the first to third embodiments, the method for selecting a preceding vehicle has been described under the assumption that the own vehicle is traveling on the same lane. In a vehicle control device according to the fourth embodiment, a method for selecting a preceding vehicle in a case where the own vehicle intends to perform lane change will be described.

Figure 8:
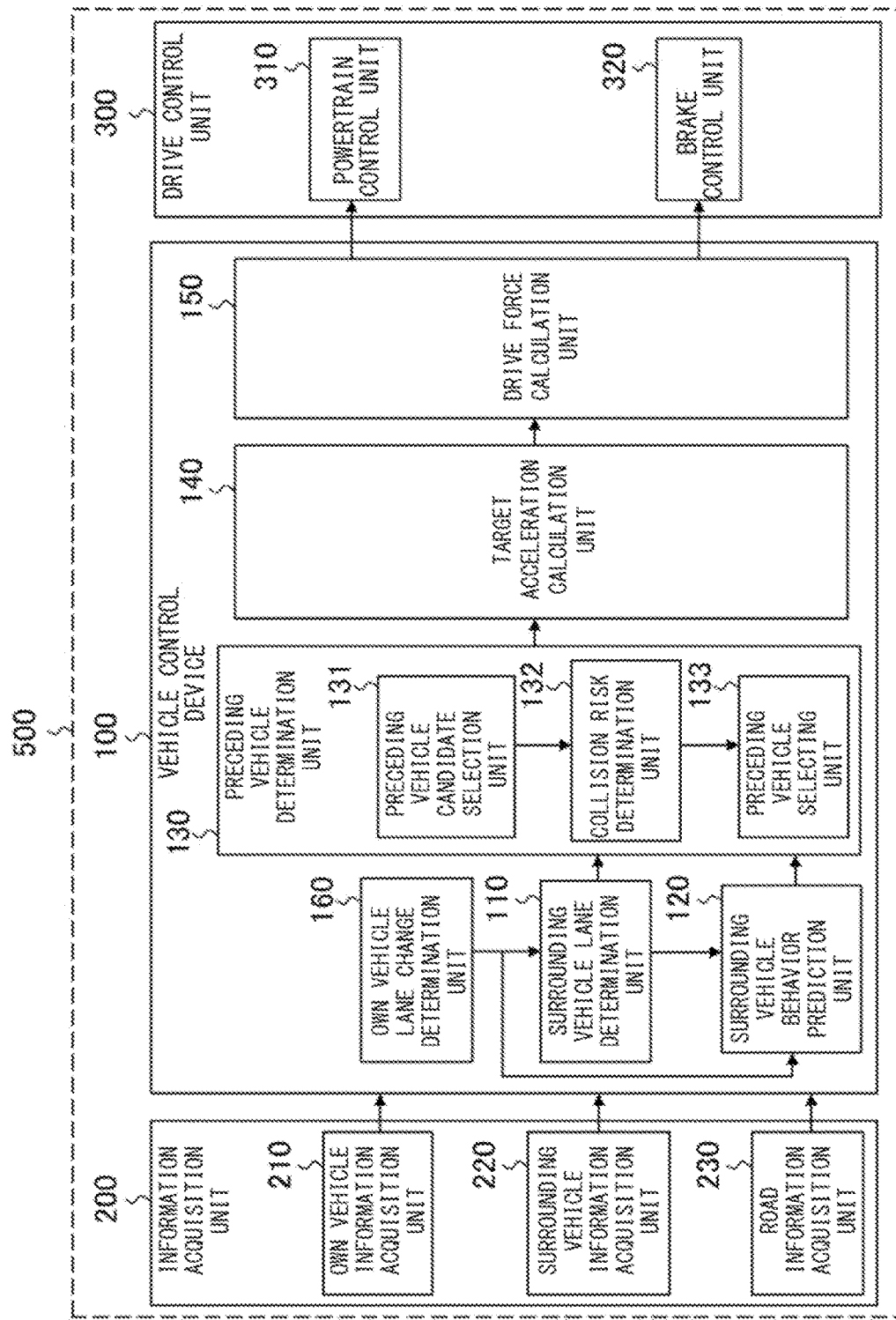
FIG. 8 is a function block diagram showing the configuration of a vehicle control system according to the fourth embodiment of the present disclosure.

FIG. 8 is a function block diagram showing the configurations of the vehicle control device and the vehicle control system according to the present embodiment. The configuration of the vehicle control system 500 in the present embodiment is similar to the configuration of the vehicle control system in the first embodiment. The vehicle control device 100 according to the present embodiment additionally includes an own vehicle lane change determination unit 160.

The own vehicle lane change determination unit 160 determines whether or not the own vehicle intends to perform lane change, on the basis of information obtained from the information acquisition unit 200. For example, if it is detected that the driver has operated the direction indicator in the own vehicle information acquisition unit 210, the own vehicle lane change determination unit 160 may determine that the own vehicle intends to perform lane change. In addition, the own vehicle lane change determination unit 160 may determine that the own vehicle intends to perform lane change, on the basis of information about a route through which the own vehicle will travel, obtained from the road information acquisition unit 230. For example, if route information indicating right turn at a frontward intersection is set in the navigation device 14 included in the road information acquisition unit 230, the own vehicle lane change determination unit 160 can determine that the own vehicle intends to perform lane change to the right lane.

The surrounding vehicle lane determination unit 110 of the present embodiment determines the own vehicle traveling lane on the basis of presence/absence of intention of the own vehicle to perform lane change, determined by the own vehicle lane change determination unit 160. Then, on the basis of this own vehicle traveling lane, the surrounding vehicle lane determination unit 110 determines the lane to which the surrounding vehicle belongs. Further, on the basis of the lane to which the surrounding vehicle belongs, determined by the surrounding vehicle lane determination unit 110, the surrounding vehicle behavior prediction unit 120 predicts whether or not the surrounding vehicle determined to be present in the adjacent lane will cut in to the front on the own vehicle traveling lane at a time point after the present.

Figure 9:
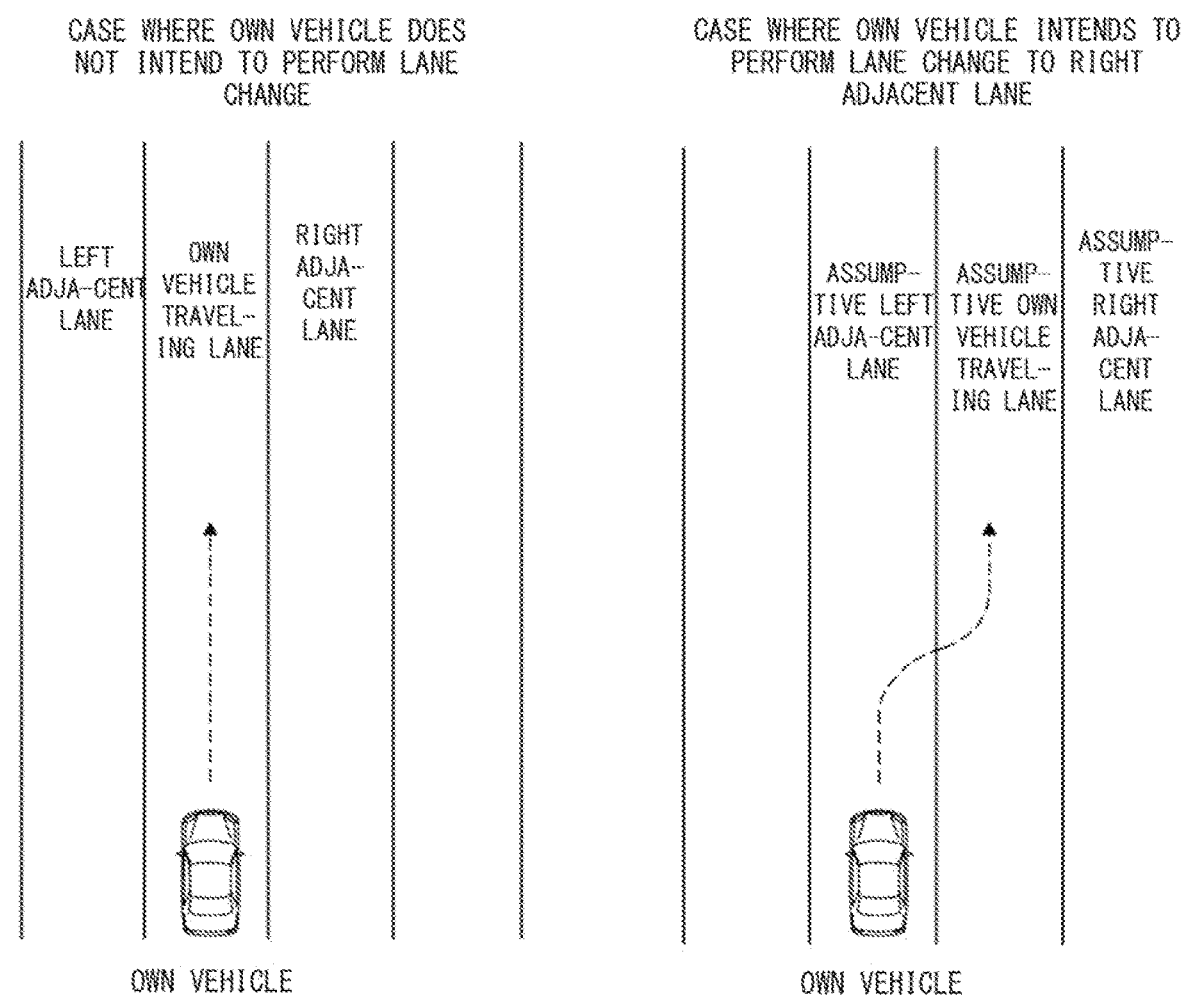
FIG. 9 illustrates operation of the vehicle control device according to the fourth embodiment.

FIG. 9 illustrates operation of the vehicle control device according to the present embodiment. The left drawing in FIG. 9 shows a case where the own vehicle lane change determination unit 160 determines that the own vehicle does not intend to perform lane change. At this time, the surrounding vehicle lane determination unit 110 determines the lane on which the own vehicle is traveling at the present as an own vehicle traveling lane, a lane adjacent at the left to the own vehicle traveling lane as a left adjacent lane, and a lane adjacent at the right to the own vehicle traveling lane as a right adjacent lane. The right drawing in FIG. 9 shows a case where the own vehicle lane change determination unit 160 determines that the own vehicle intends to perform lane change to the right lane. At this time, the surrounding vehicle lane determination unit 110 determines a lane at the right of the lane on which the own vehicle is traveling at the present as an assumptive own vehicle traveling lane, a lane adjacent at the left to the assumptive own vehicle traveling lane as an assumptive left adjacent lane, and a lane adjacent at the right to the assumptive own vehicle traveling lane as an assumptive right adjacent lane. Then, on the basis of the assumptive lanes determined by the surrounding vehicle lane determination unit 110, the surrounding vehicle behavior prediction unit 120 predicts whether or not the surrounding vehicle determined to be present in the adjacent lane will cut in to the front on the own vehicle traveling lane at a time point after the present.

In the vehicle control device configured as described above, the own vehicle lane change determination unit 160 determines whether or not the own vehicle intends to perform lane change, and if the own vehicle is determined to intend to perform lane change, the lane on which the own vehicle is traveling is assumptively changed and the lanes of the surrounding vehicles can be determined accordingly. Thus, even when the own vehicle is to perform lane change, an appropriate preceding vehicle can be selected to perform control for following the preceding vehicle, whereby comfort for the occupant is further improved.

Figure 10:
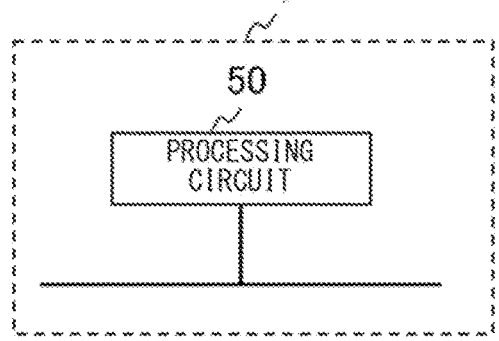
FIG. 10 shows a hardware configuration for implementing the vehicle control device and a drive control unit according to the first to fourth embodiments.

FIG. 10 shows an example of hardware of the vehicle control device 100 and the drive control unit 300 according to the first to fourth embodiments. The vehicle control device 100 and the drive control unit 300 are implemented by a processing circuit 50 shown in FIG. 10. As the processing circuit 50, a processor such as a CPU or a digital signal processor (DSP) is applied, and a program stored in a storage device is executed to implement functions of the respective units.

As the processing circuit 50, dedicated hardware may be applied. In a case where the processing circuit 50 is dedicated hardware, the processing circuit 50 may be a single circuit, a complex circuit, a programmed processor, a parallel-programmed processor, an application specific integrated circuit (ASIC), a field-programmable gate array (FPGA), or a combination thereof, for example.

Each function of the components of the vehicle control device 100 and the drive control unit 300 may be implemented by an individual processing circuit, or these functions may be collectively implemented by one processing circuit.

Figure 11:
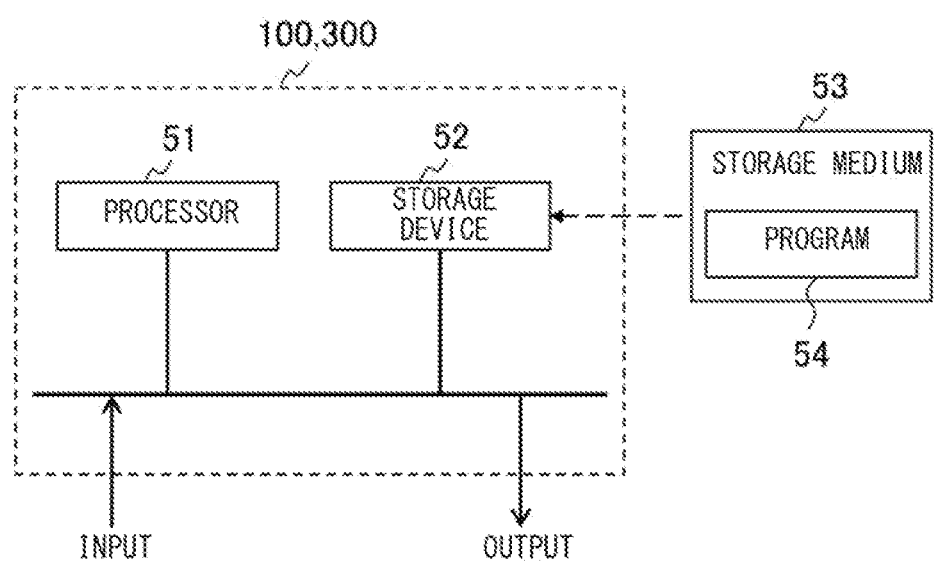
FIG. 11 shows a hardware configuration for implementing the vehicle control device and the drive control unit according to the first to fourth embodiments.

FIG. 11 shows hardware in which the vehicle control device 100 and the drive control unit 300 are formed by a processor 51 and a storage device 52. In this case, the functions of the vehicle control device 100 and the drive control unit 300 are implemented by software or the like (software, firmware, or a combination of software and firmware). The software or the like is written as a program and is stored in the storage device 52. The processor 51 functioning as a processing circuit implements the functions of the respective units by reading and executing the program stored in the storage device 52. The program stored in the storage device 52 may be a program 54 stored in a storage medium 53, for example. That is, it can be said that this program is for causing a computer to execute operation procedures of the components of the vehicle control device 100 and the drive control unit 300, and the vehicle control method.

Here, the storage device 52 may be a nonvolatile or volatile semiconductor memory, e.g., a RAM, a ROM, a flash memory, an erasable programmable read only memory (EPROM), or an electrically erasable programmable read only memory (EEPROM), or may be a hard disk drive (HDD), a magnetic disk, a flexible disk, an optical disc, a compact disc, a MiniDisc, or a digital versatile disc (DVD), and a drive device therefor, for example. Further, the storage device 52 may be any storage device that will be practically used in the future.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 own vehicle
2 steering wheel
3 steering shaft
4 steering unit
5 EPS motor
6 powertrain unit
7 brake unit
11 front camera
12 radar sensor
13 GNSS sensor
14 navigation device
15 V2X receiver
16 yaw rate sensor
17 velocity sensor
18 acceleration sensor
20 steering angle sensor
21 steering torque sensor
22 EPS controller
50 processing circuit
51 processor
52 storage device
53 storage medium
54 program
100 vehicle control device
110 surrounding vehicle lane determination unit
120 surrounding vehicle behavior prediction unit
130 preceding vehicle determination unit
131 preceding vehicle candidate selection unit
132 collision risk determination unit
133 preceding vehicle selecting unit
140 target acceleration calculation unit
150 drive force calculation unit
160 own vehicle lane change determination unit
200 information acquisition unit
210 own vehicle information acquisition unit
220 surrounding vehicle information acquisition unit
230 road information acquisition unit
300 drive control unit
310 powertrain control unit
320 brake control unit
500 vehicle control system

The invention claimed is:

1. A vehicle control device comprising:
   a surrounding vehicle lane determination circuitry to determine a lane to which a surrounding vehicle, among surrounding vehicles, present around an own vehicle belongs;
   a surrounding vehicle behavior prediction circuitry to predict whether or not, at a time point after a present, the surrounding vehicle will cut in to an own vehicle traveling lane on which the own vehicle is traveling;
   a preceding vehicle determination circuitry to determine, among the surrounding vehicles, a preceding vehicle to be followed by the own vehicle;
   a target acceleration calculation circuitry to calculate a target acceleration for keeping a vehicle-to-vehicle distance to the preceding vehicle determined by the preceding vehicle determination circuitry; and
   a drive force calculation circuitry to calculate a drive force of the own vehicle on the basis of the target acceleration calculated by the target acceleration calculation circuitry, wherein
   the preceding vehicle determination circuitry includes
      a preceding vehicle candidate selection circuitry to select, as a preceding vehicle candidate, the surrounding vehicle traveling in front on the own vehicle traveling lane and the surrounding vehicle predicted to cut in to the own vehicle traveling lane by the surrounding vehicle behavior prediction circuitry,
      a collision risk determination circuitry to determine a collision risk of each surrounding vehicle selected as the preceding vehicle candidate by the preceding vehicle candidate selection circuitry, and
      a preceding vehicle selecting circuitry to select, as the preceding vehicle, the surrounding vehicle of which the collision risk determined by the collision risk determination circuitry is greatest,
   wherein if a relative velocity of the surrounding vehicle selected as the preceding vehicle candidate with respect to the own vehicle in an advancing direction of the own vehicle is negative, the collision risk determination circuitry calculates a time to collision on the basis of the relative velocity and a relative distance between the own vehicle and the surrounding vehicle in the advancing direction of the own vehicle, and determines the collision risk to be greater as the time to collision becomes shorter, and if the relative velocity is zero or greater, the collision risk determination circuitry determines the collision risk to be greater as the relative distance becomes shorter, and
   wherein if an absolute value of the relative velocity is smaller than a predetermined threshold, the collision risk determination circuitry replaces the relative velocity with a predetermined negative set value, to determine the collision risk.

2. The vehicle control device according to claim 1, wherein
   the collision risk determination circuitry performs setting such that the collision risk set when the relative velocity is zero or greater is smaller than the collision risk set when the relative velocity is negative.

3. The vehicle control device according to claim 1, further comprising an own vehicle lane change determination circuitry to determine whether or not the own vehicle intends to perform lane change, wherein
   if the own vehicle lane change determination circuitry determines that the own vehicle intends to perform lane change, the surrounding vehicle lane determination circuitry determines an adjacent lane that is a lane change destination as the own vehicle traveling lane, and the surrounding vehicle behavior prediction circuitry predicts whether or not the surrounding vehicle will cut in to the own vehicle traveling lane determined by the surrounding vehicle lane determination circuitry.

4. The vehicle control device according to claim 1, wherein
the surrounding vehicle behavior prediction circuitry calculates a cut-in predictive probability which is a probability that the surrounding vehicle will cut in from an adjacent lane to the own vehicle traveling lane at the time point after the present, and
the collision risk determination circuitry performs correction so as to make the collision risk smaller for the preceding vehicle candidate for which the cut-in predictive probability is smaller.

5. The vehicle control device according to claim 1, wherein
the preceding vehicle candidate selection circuitry excludes, from the preceding vehicle candidates, the surrounding vehicle other than the surrounding vehicle closest to the own vehicle among the surrounding vehicles present in front on the own vehicle traveling lane.

6. The vehicle control device according to claim 1, wherein
if the preceding vehicle determination circuitry determines that the preceding vehicle is not present, the target acceleration calculation circuitry calculates the target acceleration for causing a speed of the own vehicle to reach a predetermined target speed.

7. A vehicle control system comprising:
an information acquisition circuitry to acquire information of the own vehicle and the surrounding vehicle;
the vehicle control device according to claim 1, which calculates the drive force of the own vehicle on the basis of the information of the own vehicle and the surrounding vehicle acquired by the information acquisition circuitry; and
a drive control circuitry to perform drive control for the own vehicle on the basis of the drive force of the own vehicle calculated by the vehicle control device.

8. A vehicle control method comprising:
a surrounding vehicle lane determination step of determining a lane to which a surrounding vehicle, among surrounding vehicles, present around an own vehicle belongs;
a surrounding vehicle behavior prediction step of predicting whether or not, at a time point after a present, the surrounding vehicle will cut in to an own vehicle traveling lane on which the own vehicle is traveling;
a preceding vehicle determination step of determining, among the surrounding vehicles, a preceding vehicle to be followed by the own vehicle;
a target acceleration calculation step of calculating a target acceleration for keeping a vehicle-to-vehicle distance to the preceding vehicle determined in the preceding vehicle determination step; and
a drive force calculation step of calculating a drive force of the own vehicle on the basis of the target acceleration calculated in the target acceleration calculation step, wherein
the preceding vehicle determination step includes
a preceding vehicle candidate selection step of selecting, as a preceding vehicle candidate, the surrounding vehicle traveling in front on the own vehicle traveling lane and the surrounding vehicle predicted to cut in to the own vehicle traveling lane in the surrounding vehicle behavior prediction step,
a collision risk determination step of determining a collision risk of each surrounding vehicle selected as the preceding vehicle candidate in the preceding vehicle candidate selection step, and
a preceding vehicle selecting step of selecting, as the preceding vehicle, the surrounding vehicle of which the collision risk determined in the collision risk determination step is greatest,
wherein in the collision risk determination step, if a relative velocity of the surrounding vehicle selected as the preceding vehicle candidate with respect to the own vehicle in an advancing direction of the own vehicle is negative, a time to collision is calculated on the basis of the relative velocity and a relative distance between the own vehicle and the surrounding vehicle in the advancing direction of the own vehicle, and the collision risk is determined to be greater as the time to collision becomes shorter, and if the relative velocity is zero or greater, the collision risk is determined to be greater as the relative distance becomes shorter, and
wherein in the collision risk determination step, if an absolute value of the relative velocity is smaller than a predetermined threshold, the relative velocity is replaced with a predetermined negative set value, to determine the collision risk.

9. The vehicle control method according to claim 8, wherein
in the collision risk determination step, setting is performed such that the collision risk set when the relative velocity is zero or greater is smaller than the collision risk set when the relative velocity is negative.

10. The vehicle control method according to claim 8, further comprising an own vehicle lane change determination step of determining whether or not the own vehicle intends to perform lane change, wherein
if it is determined in the own vehicle lane change determination step that the own vehicle intends to perform lane change, in the surrounding vehicle lane determination step, an adjacent lane that is a lane change destination is determined as the own vehicle traveling lane, and in the surrounding vehicle behavior prediction step, whether or not the surrounding vehicle will cut in to the own vehicle traveling lane determined in the surrounding vehicle lane determination step, is predicted.

11. The vehicle control method according to claim 8, wherein
in the surrounding vehicle behavior prediction step, a cut-in predictive probability which is a probability that the surrounding vehicle will cut in from an adjacent lane to the own vehicle traveling lane at the time point after the present, is calculated, and
in the collision risk determination step, correction is performed so as to make the collision risk smaller for the preceding vehicle candidate for which the cut-in predictive probability is smaller.

12. The vehicle control method according to claim 8, wherein
in the preceding vehicle candidate selection step, the surrounding vehicle other than the surrounding vehicle closest to the own vehicle among the surrounding vehicles present in front on the own vehicle traveling lane, is excluded from the preceding vehicle candidates.

13. The vehicle control method according to claim 8, wherein
if it is determined in the preceding vehicle determination step that the preceding vehicle is not present, in the target acceleration calculation step, the target acceleration for causing a speed of the own vehicle to reach a predetermined target speed is calculated.

14. A non-transitory computer-readable storage medium storing a program for causing a computer to execute the vehicle control method according to claim 8.

15. A vehicle control device comprising:
a surrounding vehicle lane determination circuitry to determine a lane to which a surrounding vehicle, among surrounding vehicles, present around an own vehicle belongs;
a surrounding vehicle behavior prediction circuitry to predict whether or not, at a time point after a present, the surrounding vehicle will cut in to an own vehicle traveling lane on which the own vehicle is traveling;
a preceding vehicle determination circuitry to determine, among the surrounding vehicles, a preceding vehicle to be followed by the own vehicle;
a target acceleration calculation circuitry to calculate a target acceleration for keeping a vehicle-to-vehicle distance to the preceding vehicle determined by the preceding vehicle determination circuitry; and
a drive force calculation circuitry to calculate a drive force of the own vehicle on the basis of the target acceleration calculated by the target acceleration calculation circuitry, wherein
the preceding vehicle determination circuitry includes
a preceding vehicle candidate selection circuitry to select, as a preceding vehicle candidate, the surrounding vehicle traveling in front on the own vehicle traveling lane and the surrounding vehicle predicted to cut in to the own vehicle traveling lane by the surrounding vehicle behavior prediction circuitry,
a collision risk determination circuitry to determine a collision risk of each surrounding vehicle selected as the preceding vehicle candidate by the preceding vehicle candidate selection circuitry, and
a preceding vehicle selecting circuitry to select, as the preceding vehicle, the surrounding vehicle of which the collision risk determined by the collision risk determination circuitry is greatest,
wherein if a relative velocity of the surrounding vehicle selected as the preceding vehicle candidate with respect to the own vehicle in an advancing direction of the own vehicle is negative, the collision risk determination circuitry calculates a time to collision on the basis of the relative velocity and a relative distance between the own vehicle and the surrounding vehicle in the advancing direction of the own vehicle, and determines the collision risk to be greater as the time to collision becomes shorter, and if the relative velocity is zero or greater, the collision risk determination circuitry determines the collision risk to be greater as the relative distance becomes shorter, and
wherein the collision risk determination circuitry performs setting such that the collision risk set when the relative velocity is zero or greater is smaller than the collision risk set when the relative velocity is negative.

16. A vehicle control method comprising:
a surrounding vehicle lane determination step of determining a lane to which a surrounding vehicle, among surrounding vehicles, present around an own vehicle belongs;
a surrounding vehicle behavior prediction step of predicting whether or not, at a time point after a present, the surrounding vehicle will cut in to an own vehicle traveling lane on which the own vehicle is traveling;
a preceding vehicle determination step of determining, among the surrounding vehicles, a preceding vehicle to be followed by the own vehicle;
a target acceleration calculation step of calculating a target acceleration for keeping a vehicle-to-vehicle distance to the preceding vehicle determined in the preceding vehicle determination step; and
a drive force calculation step of calculating a drive force of the own vehicle on the basis of the target acceleration calculated in the target acceleration calculation step, wherein
the preceding vehicle determination step includes
a preceding vehicle candidate selection step of selecting, as a preceding vehicle candidate, the surrounding vehicle traveling in front on the own vehicle traveling lane and the surrounding vehicle predicted to cut in to the own vehicle traveling lane in the surrounding vehicle behavior prediction step,
a collision risk determination step of determining a collision risk of each surrounding vehicle selected as the preceding vehicle candidate in the preceding vehicle candidate selection step, and
a preceding vehicle selecting step of selecting, as the preceding vehicle, the surrounding vehicle of which the collision risk determined in the collision risk determination step is greatest,
wherein in the collision risk determination step, if a relative velocity of the surrounding vehicle selected as the preceding vehicle candidate with respect to the own vehicle in an advancing direction of the own vehicle is negative, a time to collision is calculated on the basis of the relative velocity and a relative distance between the own vehicle and the surrounding vehicle in the advancing direction of the own vehicle, and the collision risk is determined to be greater as the time to collision becomes shorter, and if the relative velocity is zero or greater, the collision risk is determined to be greater as the relative distance becomes shorter, and
wherein in the collision risk determination step, setting is performed such that the collision risk set when the relative velocity is zero or greater is smaller than the collision risk set when the relative velocity is negative.

* * * * *